United States Patent
Katsurahira

(10) Patent No.: US 9,304,615 B2
(45) Date of Patent: Apr. 5, 2016

(54) CAPACITIVE STYLUS PEN HAVING A TRANSFORMER FOR BOOSTING A SIGNAL

(71) Applicant: Wacom Co., Ltd., Saitama (JP)

(72) Inventor: Yuji Katsurahira, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 14/521,247

(22) Filed: Oct. 22, 2014

(65) Prior Publication Data

US 2015/0145836 A1 May 28, 2015

(30) Foreign Application Priority Data

Nov. 27, 2013 (JP) ................................ 2013-244822

(51) Int. Cl.
*G06F 3/033* (2013.01)
*G06F 3/038* (2013.01)
*G06F 3/0354* (2013.01)
*G06F 3/044* (2006.01)

(52) U.S. Cl.
CPC .......... *G06F 3/0383* (2013.01); *G06F 3/03545* (2013.01); *G06F 3/044* (2013.01)

(58) Field of Classification Search
CPC .... G06F 3/03545; G06F 3/0383; G06F 3/044
USPC ........................................................ 345/179
See application file for complete search history.

(56) References Cited

U.S. PATENT DOCUMENTS

2007/0146351 A1* 6/2007 Katsurahira ........ G06F 3/03545
345/179
2008/0099254 A1* 5/2008 Katsurahira ............ G06F 3/046
178/18.01

(Continued)

FOREIGN PATENT DOCUMENTS

EP   1 806 647 A2   7/2007
EP   2 511 800 A2   10/2012
JP   06250772 A    9/1994

(Continued)

OTHER PUBLICATIONS

"Electromotive force—Wikipedia, the free encyclopedia," Nov. 13, 2013, XP055167160, Retrieved from "URL: http://en.wikipedia.org/w/index.php?title=Electromotive_force&oldid=581462775#Electromagnetic_induction," on Feb. 4, 2015, 14 pages.

(Continued)

*Primary Examiner* — Long D Pham
(74) *Attorney, Agent, or Firm* — Seed IP Law Group PLLC

(57) ABSTRACT

A capacitive stylus pen is provided that inputs an indicated position to a tablet by capacitive coupling. The capacitive stylus pen includes a signal generating circuit that generates a signal having the same frequency as a frequency of a signal to be transmitted from an electrode, a transformer that boosts the generated signal and that includes a primary winding and a secondary winding, and an analog switch for controlling connection between a first end of the secondary winding and the electrode to an on-state or an off-state. The capacitive stylus pen further includes a power extracting circuit that extracts power to be supplied to the analog switch from an electromotive force induced in the secondary winding, and a capacitor coupled to a second end of the secondary winding to set the second end at a fixed potential in an alternating-current manner.

20 Claims, 3 Drawing Sheets

(56) References Cited

U.S. PATENT DOCUMENTS

2011/0090146 A1* 4/2011 Katsurahira ........ G06F 3/03545
                                                         345/156
2012/0256830 A1* 10/2012 Oda .................... G06F 3/03545
                                                         345/157

FOREIGN PATENT DOCUMENTS

| JP | 7295722 A | 11/1995 |
| JP | 2007164356 A | 6/2007 |
| JP | 2007-183809 A | 7/2007 |
| WO | 2006/059336 A2 | 6/2006 |

OTHER PUBLICATIONS

"Transformer—Wikipedia, the free encyclopedia," Nov. 22, 2013, XP005167141, Retrieved from "URL: http://en.wikipedia.org/w/index.php?title=Transformer&oldid=582882962," on Feb. 4, 2015, 30 pages.

Extended European Search Report dated Mar. 4, 2015, for corresponding EP Application No. 14194652.5-1972, 12 pages.

* cited by examiner

F I G . 1
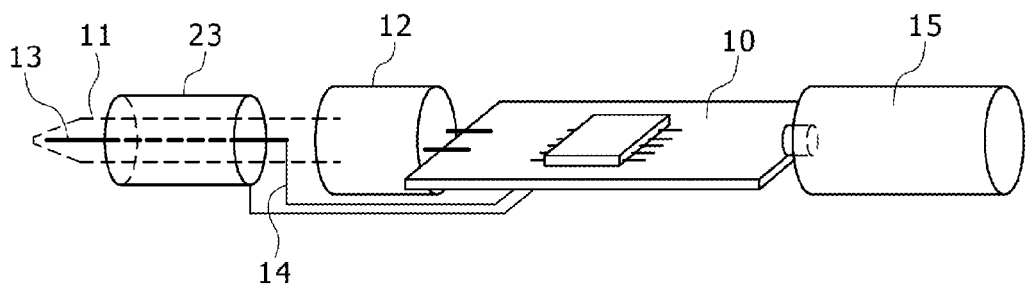

CAPACITIVE STYLUS PEN HAVING A TRANSFORMER FOR BOOSTING A SIGNAL

FIELD OF THE INVENTION

The present disclosure relates to improvements in a position indicator (e.g., capacitive stylus pen) in which an indicated position on a position detecting device (e.g., tablet) is detected based on a capacitive system.

BACKGROUND

Japanese Patent Laid-Open No. 2007-164356, hereinafter JP 164356, discloses a position indicator in which a coil is provided at a position indicating part of the indicator to obtain a coordinate position by electromagnetic induction with a tablet. JP 164356 also discloses a position indicator in which an electrode (a conductor core) is provided at a position-indicating part to obtain an indicated position by capacitive coupling with a tablet.

In addition, JP 164356 discloses that a writing pressure detected inside a position indicator is converted to digital information, and a transmission signal is subjected to amplitude shift keying (ASK) modulation to transmit writing pressure information as the digital information. As a result, the position indicator can stably detect and transmit the writing pressure without suffering from external influences such as noise.

Moreover, JP 164356 discloses a position indicator that uses an electric double-layer capacitor as a power supply to extend the use of the position indicator with a single charge.

Furthermore, other position indicators using a capacitive system are disclosed in Japanese Patent Laid-Open No. Hei 07-295722 and Japanese Patent Laid-Open No. Hei 06-250772.

The above-described position indicators, which use a capacitive system, have a common characteristic that a tablet sensor is able to detect a position indicator (e.g., a stylus) and can be used also as a touch panel to detect an object (e.g., a finger).

SUMMARY

Although it may be advantageous for a tablet sensor to also serve as a touch panel, position detection based on a capacitive system has a problem of being more susceptible to the influence of noise than an electromagnetic induction system. The noise problem may be alleviated by increasing a transmission voltage output by the position indicator of the capacitive system.

A transmission signal of the above-described high voltage is needed, which may be modulated with information on a writing pressure or the like. This in turn requires that the position indicator be provided with a high-voltage power supply.

In the position indicators of the type described above, the capacitance and voltage of a battery or a capacitor used as a power supply are generally limited in order to improve their operability. Thus, to increase the transmission voltage as described above, the supply voltage needs to be boosted through a direct current-direct current (DC-DC) converter, or the like. This would lead to problems, such as an increase in power consumption by the position indicator and a decrease in usage time for which the position indicator can be operated with a single charge.

According to an aspect, the present disclosure presents solutions for the above-described problems. In one embodiment a capacitive stylus pen is provided, which includes a light-weight, small-size battery or capacitor as a power supply, and which is operable to transmit a signal having larger voltage amplitude than a voltage of the power supply. The transmission signal may be modulated with information such as a writing pressure. Thus, the capacitive stylus pen allows a tablet to obtain information on an indicated position, a writing pressure, and so forth, accurately and reliably.

According to one aspect of the present invention, a capacitive stylus pen is provided, which includes a light-weight, small-size battery or capacitor as a power supply and which has low power consumption so as not to require frequent charging or battery replacement.

The present disclosure provides the following configurations and embodiments of a capacitive stylus pen that inputs an indicated position to a table based on capacitive coupling with the tablet.

In one embodiment, the capacitive stylus pen includes an electrode provided at a position indicating part of the pen, and a signal generating circuit that generates a signal having the same frequency as a frequency of a signal to be transmitted from the electrode. The capacitive stylus pen also includes a transformer that boosts the signal generated by the signal generating circuit and that includes a primary winding and a secondary winding that are wound around a magnetic body. The capacitive stylus pen still further includes an analog switch for controlling a connection between a first end of the secondary winding of the transformer and the electrode to be in an on-state or an off-state. The capacitive stylus pen also includes a power extracting circuit that extracts power to be supplied to the analog switch from an electromotive force induced in the secondary winding of the transformer. The capacitive stylus pen further includes a capacitor coupled to a second end of the secondary winding of the transformer to set the second end of the secondary winding at a fixed potential in an alternating-current manner.

In one aspect, the analog switch is controlled according to information represented by a binary code, to transmit the information by ASK modulation.

In another aspect, writing pressure information is included in the information represented by the binary code.

In another aspect, the signal generating circuit is formed of a line control (LC) oscillation circuit including the primary winding of the transformer as a constituent element of the LC oscillation circuit.

According to embodiments of the present invention, amplitude of an alternating current (AC) signal generated by the signal generating circuit is boosted by the transformer. The boosted signal is supplied to the electrode provided at the position indicating part of the capacitive stylus pen via the analog switch. The capacitor is connected to the second end of the secondary winding of the transformer to set the second end at a fixed potential in an alternating-current manner. Power is extracted from the first end of the secondary winding and is supplied as power supply for the analog switch. Therefore, the connection of the first end of the secondary winding to the electrode can be switched between the on-state or the off-state without lowering the amplitude of the signal on the secondary winding side, which allows for the tablet to stably obtain the indicated position of the capacitive stylus pen.

Furthermore, information on the writing pressure and so forth is transmitted as digital information by ASK modulation. Therefore, the information transmission is less susceptible to the influence of noise and the information on the writing pressure and so forth can be accurately obtained by the tablet.

In addition, a signal with large amplitude can be generated and controlled without increasing the supply voltage and, thus, power consumption can be reduced. Accordingly, operation time of the capacitive stylus pen may be extended, even with a power supply that uses a light-weight, small-size battery or capacitor.

In one aspect, the signal generating circuit is formed by an LC oscillation circuit including the primary winding of the transformer as a constituent element. Therefore, signal generation with low power consumption becomes possible. Accordingly, operation time of the capacitive stylus pen may be extended, even with a power supply that uses a light-weight, small-size battery or capacitor.

BRIEF DESCRIPTION OF THE DRAWINGS

FIG. 1 is a diagram showing an example of an internal structure of a capacitive stylus pen in accordance with an embodiment disclosed herein.

DETAILED DESCRIPTION

Figure 2:
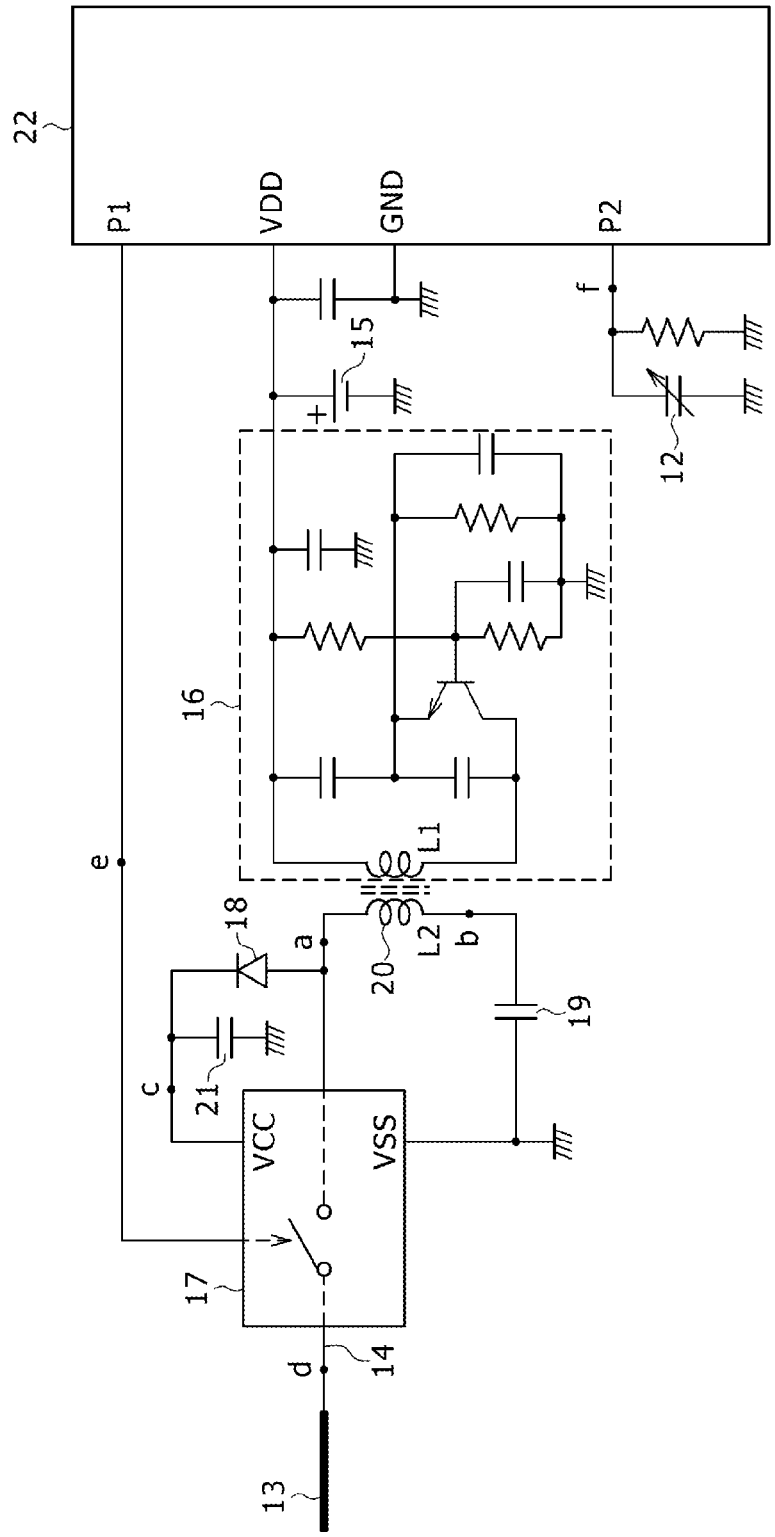
FIG. 2 is a diagram showing an example of a circuit configuration of the capacitive stylus pen in accordance with an embodiment disclosed herein.

A capacitive stylus pen according to the present disclosure will be described below with reference to the drawings. FIG. 1 is a diagram showing an internal structure example of the capacitive stylus pen according to one embodiment of the present disclosure. FIG. 2 is one example of a circuit configuration diagram of the capacitive stylus pen according to one embodiment of the present disclosure. In FIGS. 1 and 2, the same constituent element is shown by the same numeral.

Numeral 10 denotes a printed board on which circuit elements, ICs, and so forth configuring the circuit of FIG. 2 are disposed. Numeral 11 denotes a pen core that forms a position indicating part of the capacitive stylus pen. Numeral 12 denotes a capacitance-variable capacitor whose capacitance changes according to the writing pressure. Numeral 13 denotes an electrode provided inside the pen core 11. Numeral 14 denotes a connection line between circuitry disposed on the printed board 10 and the electrode 13.

In one embodiment, the capacitance-variable capacitor 12 may be a capacitance-variable capacitor that is disclosed in Japanese Patent Laid-Open No. 2011-186803. For example, the capacitance-variable capacitor 12 capacitance may change according to a writing pressure applied to the pen core 11. A description of the configuration of a capacitance-variable capacitor is omitted in the present disclosure.

The pen core 11 is physically joined to the capacitance-variable capacitor 12 to transmit a writing pressure to the capacitance-variable capacitor 12. In addition, the electrode 13 is electrically connected to the connection line 14 where the pen core 11 and the capacitance-variable capacitor 12 are joined. That is, the pressure applied to the pen core 11 is transmitted to the capacitance-variable capacitor 12 and a transmission signal generated in the printed board 10 is transmitted, via the connection line 14, from the electrode 13.

Numerals 15, 16, and 17 denote a battery, an oscillation circuit, and an analog switch, respectively. Numerals 18, 19, and 20 denote a diode, a capacitor, and a transformer, respectively. In one embodiment, the analog switch 17 is a semiconductor device, such as a field effect transistor (FET). The transformer 20 includes a primary winding L1 and a secondary winding L2. The primary winding L1 forms a resonant circuit and is included in the oscillation circuit 16.

Numeral 23 (see FIG. 1) denotes a shield electrode having a hollow cylindrical shape. The shield electrode 23 is disposed to surround an outer circumference of the pen core 11 except for a tip part of the electrode 13. The shield electrode 23 is connected to a fixed potential in the circuit of FIG. 2, such as to a negative terminal of the battery 15.

Typically, a signal generated by the oscillation circuit 16 can only achieve a voltage that is approximately twice the battery voltage for the voltage across the primary winding L1. For example, if the voltage of the battery 15 is set to 1.5 V, the oscillation circuit 16 may only achieve a voltage of about 3 V. However, by adjusting a turns ratio between the primary winding L1 and the secondary winding L2 to, for example, one to three, a signal with voltage that is up to approximately three times the voltage of the primary winding L1 (e.g., 9 V) may be generated across the secondary winding L2.

One (first) end of the secondary winding L2 is connected to the electrode 13 via the analog switch 17 and is also connected to an anode side of the diode 18. Power is extracted from a voltage generated at the first end of the secondary winding L2 and is accumulated in a capacitor 21. The capacitor 21 is connected to a positive-side power supply terminal VCC of the analog switch 17. As a result, power is supplied to the analog switch 17.

With the above-described configuration, only a power of about 4.5 V can be extracted because the diode 18 allows the passage of only the positive half-cycles of the AC voltage generated in the secondary winding L2. To address this, the capacitor 19 is inserted between the other (second) end of the secondary winding L2 and a negative-side power supply terminal VSS of the analog switch 17. Further, the negative-side power supply terminal VSS of the analog switch 17 is connected to a reference potential terminal GND (negative terminal of the battery 15). As a result, in a steady state, the capacitor 19 is charged to about 4.5 V with respect to the amplitude 9 V of the secondary winding L2. Therefore, the voltage generated at the first end of the secondary winding L2 reaches 9 V at its peak and, thus, power of about 9 V is extracted in the capacitor 21.

Figure 3:
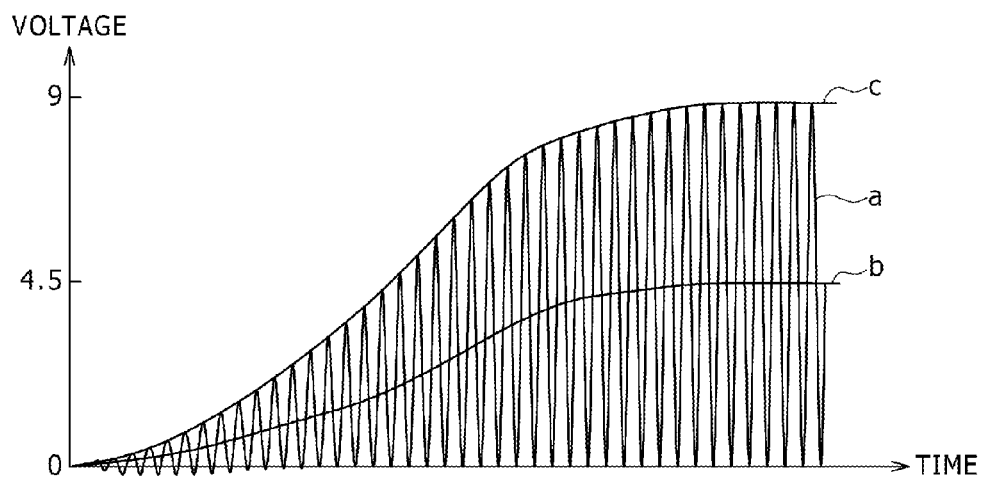
FIG. 3 is a diagram showing an example of voltages of a circuit configuration of the capacitive stylus pen in accordance with an embodiment disclosed herein.

FIG. 3 is a diagram showing one example of how voltages at point a, point b, and point c of FIG. 2 may change in the period from activation of the oscillation circuit 16 to when a voltage of the capacitor 19 reaches a steady state.

Numeral 22 denotes a microprocessor that operates based on a predetermined program. As will be described later, the microprocessor 22 charges and discharges the capacitance-variable capacitor 12 by setting a terminal P2 to a high-level output state or an input state based on the predetermined program, and obtains the value of the writing pressure applied to the pen core 11 as a digital value.

An AC signal generated at the first end (point a of FIG. 2) of the secondary winding L2 of the transformer 20 is subjected to ASK modulation by the analog switch 17 and an output signal thereof (point d of FIG. 2) is supplied to the electrode 13 via the connection line 14.

Figure 4:
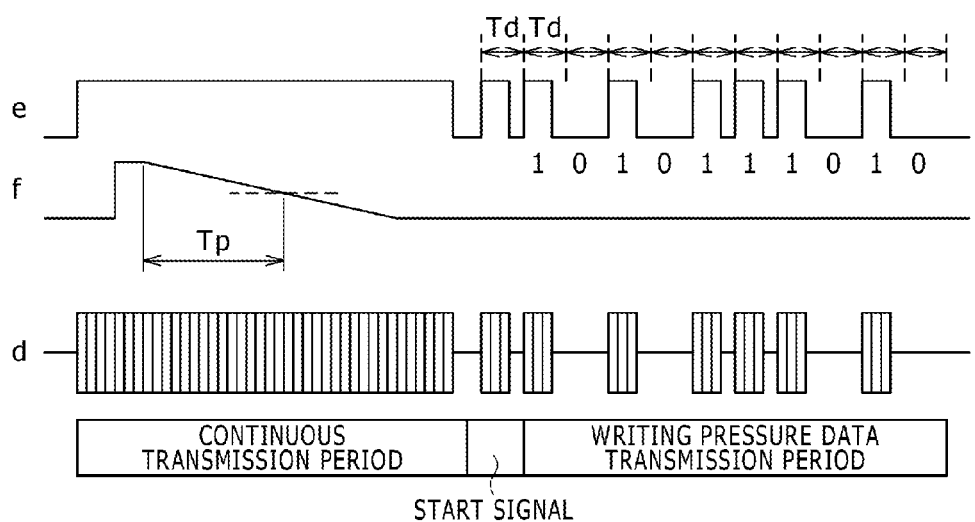
FIG. 4 is a diagram showing an example of signals of a circuit configuration of the capacitive stylus pen in accordance with an embodiment disclosed herein.

FIG. 4 is a diagram showing one example of how signals at point e, point f, and point d of FIG. 2 may change. The microprocessor 22 carries out control to keep a terminal P1 of FIG. 2 (point e) at a high level for a certain period of time. See the signal at point e in FIG. 4. As a result, during this period of time, a signal is radiated from the electrode 13 continuously. See the continuously transmitted signal at point d during the "CONTINUOUS TRANSMISSION PERIOD" as shown in FIG. 4.

In this continuous transmission period, the microprocessor 22 controls the terminal P2 to obtain a writing pressure applied to the capacitance-variable capacitor 12. Specifically, the microprocessor 22 charges the capacitance-variable capacitor 12 by setting the terminal P2 to a high-level output state. Subsequently, the microprocessor 22 switches the terminal P2 to an input state. At this time, a charge accumulated in the capacitance-variable capacitor 12 is discharged by a resistor coupled in parallel to the capacitance-variable capacitor 12. Thus, the voltage of the capacitance-variable capacitor 12 gradually decreases. See the signal at point f in FIG. 4. The time Tp of FIG. 4 is the period from the switching of the terminal P2 to the input state to when a voltage at point f is equal to or lower than a threshold. The time Tp is equivalent to the writing pressure to be obtained. In this particular embodiment, the microprocessor 22 obtains the writing pressure (based on Tp) as a 10-bit value.

After the continuous transmission period has ended, the microprocessor 22 carries out ASK modulation by controlling the terminal P1 to be a high and low levels with a predetermined cycle Td. See the signal at point e of FIG. 4. At this time, in the first cycle, the microprocessor 22 may set the terminal P1 to a high level. See the start signal of FIG. 4. The purpose of this is to allow the tablet side to accurately determine the subsequent data transmission timing.

Subsequent to the start signal, the microprocessor 22 sequentially transmits the writing pressure data of 10 bits obtained by the above-described operation. Specifically, the microprocessor 22 sets the terminal P1 to a low level when the transmission data is 0 and sets the terminal P1 to the high level when the transmission data is 1. See the writing pressure data transmission period of FIG. 4. For example, FIG. 4 shows a case in which the writing pressure to be transmitted is "1010111010."

In one embodiment, the operation of FIG. 4 is repeatedly carried out.

In the above-described embodiments, the turns ratio of the transformer 20 is set to one to three and the signal with amplitude of 9 V is generated on the secondary side. However, the turns ratio of the transformer 20 may be lowered to generate amplitude of a higher voltage. Alternatively, the turns ratio may be increased.

In the above-described embodiments, the battery of 1.5 V is used as a power supply. However, a battery of a different voltage may be used or a chargeable secondary battery may be used. Furthermore, an electric double-layer capacitor may be used as a power supply.

In the above-described embodiments, the voltage of the battery is used as the power supply for the circuit as it is. However, the voltage may be used after being stabilized through conversion to a different voltage.

In the above-described embodiments, the first end of the secondary winding of the transformer 20 is connected to the anode side of the diode 18, and, thereby, the voltage generated at the first end of the secondary winding is extracted as power supply in the positive direction. However, an orientation of the diode may be changed and the voltage may be extracted as power supply in the negative direction to be supplied to the negative-side power supply terminal of the analog switch 17.

In the above-described embodiments, only the writing pressure is reported as the information transmitted by ASK modulation. However, other kinds of information, such as switch information and an ID code unique to the pen, may be transmitted.

It is to be noted that the embodiments of the present disclosure is not limited to the foregoing embodiments, and that various changes can be made without departing from the spirit of the present disclosure.

The invention claimed is:

1. A capacitive stylus pen, comprising:
   an electrode configured to transmit a first signal, the electrode being positioned at a position indicating part of the capacitive stylus pen;
   a signal generating circuit configured to generate a second signal, the second signal having a frequency that is substantially the same as a frequency of the first signal;
   a transformer configured to boost the second signal, the transformer including a primary winding and a secondary winding that are wound around a magnetic body;
   an analog switch configured to set the electrode to an on-state and an off-state by control of a connection between a first end of the secondary winding and the electrode;
   a power extracting circuit configured to extract power to be supplied to the analog switch from the secondary winding; and
   a capacitor configured to set a second end of the secondary winding to a fixed potential in an alternating-current manner, the capacitor being coupled to the second end.

2. The capacitive stylus pen according to claim 1, wherein the analog switch is set to an on-state or an off-state according to information represented by a binary code, to transmit the information by amplitude shift keying (ASK) modulation.

3. The capacitive stylus pen according to claim 2, wherein the information includes writing pressure information.

4. The capacitive stylus pen according to claim 1, wherein the signal generating circuit includes a line control (LC) oscillation circuit that includes the primary winding.

5. The capacitive stylus pen according to claim 1, wherein the primary winding and the secondary winding have a turns ration of one to three.

6. The capacitive stylus pen according to claim 1, wherein the power extracted from the secondary winding is an electromotive force induced in the secondary winding.

7. A capacitive position indicator, comprising:
   a processor;
   a signal generating circuit coupled to the processor and configured to generate a signal;
   a transformer configured to receive and boost the signal;
   a power extracting circuit configured to generate power by accumulation of the boosted signal from the transformer;
   an analog switch configured to switch between an on-state and an off-state to transmit and not transmit the boosted signal, respectively, the analog switch being powered by the power generated by the power extracting circuit; and
   an electrode configured to receive, via the analog switch, and transmit the boosted signal when the analog switch is in the on-state.

8. The capacitive position indicator according to claim 7, further comprising:
   a battery, the signal generating circuit being powered by the battery.

9. The capacitive position indicator according to claim 7, wherein the transformer includes a first coil and a second coil, the first coil being electrically coupled to the signal generating circuit, the second coil being electrically coupled to the power extracting circuit.

10. The capacitive position indicator according to claim 9, wherein the power extracting circuit includes a first capacitor, a second capacitor, and a diode, the first capacitor being electrically coupled to the diode, the diode being electrically coupled to a first end of the second coil, the second capacitor being electrically coupled to a second end of the second coil.

11. The capacitive position indicator according to claim 10, wherein the second capacitor is configured to set the second end of the second coil to a fixed potential in an alternating-current manner.

12. The capacitive position indicator according to claim 9, wherein the power extracting circuit generates power by accumulating the boosted signal from the second coil.

13. The capacitive position indicator according to claim 7, wherein the signal generating circuit includes a line control (LC) oscillation circuit.

14. The capacitive position indicator according to claim 7, wherein the boosted signal includes writing pressure information and is transmitted using amplitude shift keying (ASK) modulation.

15. The capacitive position indicator according to claim 7, wherein the signal generated by the signal generating circuit has a frequency that is substantially equal to a frequency of the boosted signal to be transmitted from the electrode.

16. A method of controlling signal transmission from a capacitive position indicator, comprising:
 generating, by a signal generating circuit, a signal;
 boosting, by a transformer, the signal;
 generating power, by a power extracting circuit, by accumulating the boosted signal from the transformer;
 powering, by the power extracting circuit, an analog switch by supplying the generated power to the analog switch;
 switching, by the analog switch, to an on-state; and
 transmitting, by an electrode, the boosted signal in response to the analog switch switching to the on-state.

17. The method according to claim 16, further comprising:
 powering, by a battery, the signal generating circuit.

18. The method according to claim 16, wherein the transformer includes a first coil and a second coil, the first coil being electrically coupled to the signal generating circuit, the second coil being electrically coupled to the power extracting circuit.

19. The method according to claim 18, wherein the power extracting circuit includes a first capacitor, a second capacitor, and a diode, the first capacitor being electrically coupled to the diode, the diode being electrically coupled to a first end of the second coil, the second capacitor being electrically coupled to a second end of the second coil, and the method further comprises:
 setting, by the second capacitor, the second end of the second coil to a fixed potential in an alternating-current manner.

20. The method according to claim 16, wherein the boosted signal includes writing pressure information and is transmitted using amplitude shift keying (ASK) modulation.

* * * * *